US011555553B2

United States Patent
Sierakowski-Larsen

(10) Patent No.: US 11,555,553 B2
(45) Date of Patent: *Jan. 17, 2023

(54) NON-RETURN VALVE

(71) Applicant: GRUNDFOS HOLDING A/S, Bjerringbro (DK)

(72) Inventor: Janus Lukas Sierakowski-Larsen, Langå (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 235 days.

This patent is subject to a terminal disclaimer.

(21) Appl. No.: 16/704,479

(22) Filed: Dec. 5, 2019

(65) Prior Publication Data
US 2020/0109792 A1    Apr. 9, 2020

Related U.S. Application Data

(63) Continuation of application No. 15/293,942, filed on Oct. 14, 2016, now Pat. No. 10,533,674.

(30) Foreign Application Priority Data

Oct. 15, 2015 (EP) ..................... 15189914

(51) Int. Cl.
F16K 27/02    (2006.01)
F04D 29/42    (2006.01)
(Continued)

(52) U.S. Cl.
CPC .......... F16K 27/0209 (2013.01); F04D 13/06 (2013.01); F04D 13/16 (2013.01);
(Continued)

(58) Field of Classification Search
CPC ...... F04D 13/16; F04D 13/06; F04D 15/0022; F04D 1/06; F04D 29/4293; F04D 29/628;
(Continued)

(56) References Cited

U.S. PATENT DOCUMENTS 2,161,284 A  *  6/1939  Crowell ................. E21B 33/16
                                              166/154
2,338,101 A  *  1/1944  Ellinwood ............ F16K 15/025
                                              251/258
(Continued)

FOREIGN PATENT DOCUMENTS

DE    0992687 A3  *  1/2001    .............. F04B 17/03
EP    0992687 A2     4/2000
(Continued)

*Primary Examiner* — Kenneth J Hansen
*Assistant Examiner* — Benjamin Doyle
(74) *Attorney, Agent, or Firm* — McGlew and Tuttle, P.C.

(57) ABSTRACT

A non-return valve (19) for a water supply system (1) or a pump (4) is integrated in a flow channel (14) of the water supply system (1). The non-return valve (19) includes a sealing body (21) which is mounted within the channel (14), blocks the channel (14) in a first position forming the closure position and releases the channel (14) in a second position forming the opened position. The sealing body (21) is movably arranged on a holder (31) which includes a closure body (15), with which the holder (31) is releasably fastened in a housing opening.

19 Claims, 5 Drawing Sheets

(51) Int. Cl.
*F04D 13/06* (2006.01)
*F16K 15/06* (2006.01)
*F04D 13/16* (2006.01)
*F04D 15/00* (2006.01)
*F04D 1/06* (2006.01)
*F04D 29/62* (2006.01)

(52) U.S. Cl.
CPC ..... *F04D 15/0022* (2013.01); *F04D 29/4293* (2013.01); *F16K 15/063* (2013.01); *F04D 1/06* (2013.01); *F04D 29/628* (2013.01); *F05D 2250/52* (2013.01)

(58) Field of Classification Search
CPC ...... F04D 15/0005; F04D 9/02; F16K 15/063; F16K 27/0209; F16K 15/025; F16K 15/02; F16K 15/026; F16K 15/06; F16K 15/064; F05D 2250/52; F04B 53/10
See application file for complete search history.

(56) References Cited

U.S. PATENT DOCUMENTS

| | | | | |
|---|---|---|---|---|
| 2,574,054 | A * | 11/1951 | Miller | F16K 15/063 251/210 |
| 2,943,639 | A * | 7/1960 | Smith | F16K 15/063 137/515.7 |
| 3,001,546 | A * | 9/1961 | Salisbury | F16K 15/026 137/541 |
| 3,219,056 | A * | 11/1965 | Dyson | F16K 15/1826 137/514.7 |
| 3,288,167 | A * | 11/1966 | Gibson | F16K 27/0209 137/541 |
| 4,016,903 | A * | 4/1977 | Akashi | F15B 21/047 137/493.5 |
| 4,368,756 | A * | 1/1983 | Carlson | F16K 15/06 137/541 |
| 4,535,808 | A * | 8/1985 | Johanson | F16K 15/063 137/533.21 |
| 4,667,697 | A * | 5/1987 | Crawford | F16K 15/025 137/543.17 |
| 4,986,502 | A * | 1/1991 | Ceroke | F16J 13/24 251/216 |
| 5,207,242 | A * | 5/1993 | Daghe | E03C 1/106 137/454.6 |
| 6,039,073 | A * | 3/2000 | Messick | F16K 15/063 137/515.7 |
| 7,185,671 | B2 * | 3/2007 | Duex | F16K 15/066 137/454.6 |
| 7,287,547 | B2 * | 10/2007 | Arnold | F04B 53/1027 137/514.5 |
| 7,721,757 | B2 * | 5/2010 | Ginies | F04B 39/023 137/542 |
| 9,032,992 | B2 * | 5/2015 | Andersson | F16K 25/005 137/516.29 |
| 9,611,948 | B1 * | 4/2017 | Andersson | F16K 15/18 |
| 10,670,153 | B2 * | 6/2020 | Filipow | C21D 9/50 |
| 10,670,156 | B2 * | 6/2020 | McLean | F16K 15/028 |
| 2002/0195147 | A1 * | 12/2002 | Nixon | F16K 15/026 137/541 |
| 2005/0103386 | A1 * | 5/2005 | Magda | F16K 15/026 137/541 |
| 2005/0230300 | A1 * | 10/2005 | Kato | B01D 35/147 210/234 |
| 2005/0232796 | A1 * | 10/2005 | Pohler | F04D 29/426 417/423.15 |
| 2006/0249703 | A1 * | 11/2006 | Gilbert | F16K 15/025 251/337 |
| 2007/0062603 | A1 * | 3/2007 | Mackey | F16K 27/0209 141/113 |
| 2010/0282331 | A1 * | 11/2010 | Newman | F16K 17/16 137/68.19 |
| 2014/0030127 | A1 * | 1/2014 | Fellmeth | F04B 53/1025 417/559 |
| 2014/0083541 | A1 * | 3/2014 | Chandrasekaran | F04B 53/10 137/625.48 |
| 2014/0124065 | A1 * | 5/2014 | Dang | F16K 27/0209 137/528 |
| 2014/0241921 | A1 * | 8/2014 | Tazioli | F04D 29/5813 417/423.14 |
| 2019/0011051 | A1 * | 1/2019 | Yeung | E21B 43/26 |

FOREIGN PATENT DOCUMENTS

EP 2211057 A1 7/2010
GB 350836 A 6/1931

* cited by examiner

NON-RETURN VALVE

CROSS REFERENCE TO RELATED APPLICATIONS

This application is a continuation under 37 CFR 1.53(b) of pending prior U.S. patent application Ser. No. 15/293,942 filed Oct. 14, 2016, which claims the priority of European Application 15 189 914.3 filed Oct. 15, 2015, the entire contents of each application are incorporated herein by reference.

FIELD OF THE INVENTION

The invention relates to a non-return valve for a water supply system or a pump and which is integrated into a flow channel of the water supply system or of the pump or of a valve housing and which comprises a sealing body which is movably mounted within the channel, blocks the channel in a first position forming the closure position and releases the channel in a second position forming the opened position.

BACKGROUND OF THE INVENTION

Non-return valves are counted as belonging to the state of the art in numerous design variants, and they are applied where a flow is desired in only one direction, in order to hold fluid in a channel system or vessel, or for other purposes.

With water supply systems or pumps, a non-return valve is typically provided on the delivery side of the pump, in order to ensure that the system pressure is held at the delivery side after switching off the pump and fluid does not flow back through the pump. One the other hand, with water supply systems which are operated with centrifugal pumps, but also with other centrifugal pumps if these are to operate in quasi self-priming, it is necessary on the one hand to design these accordingly and on the other had to provide a closable filling opening, in order to ensure that fluid is located in the pump on first starting operation. A closable filling opening is to be provided upstream of the non-return valve in the flow direction, since the non-return valve is to prevent a backflow into the pump.

A known water supply system of this type is marketed by the applicant under the description Grundfos MQ. This design in practice has proven its worth, but however has the designs described above and the disadvantages which these entail. Thus, the non-return valve requires comparatively much effort for its installation and removal. Thereby, it is to be ensured that pressure no longer prevails at the delivery side, in order to avoid an uncontrolled pressure loss on removal of the non-return valve and the danger potential which this always entails.

SUMMARY OF THE INVENTION

Against this background, it is an object of the invention to improve a non-return valve for a water supply system or for a pump, to the extent that the accessibility and the handling on assembly and disassembly can be improved. Moreover, a water supply system equipped with such a non-return valve is to be improved in its construction and function.

This object is achieved by a non-return valve with the features according to the invention. This object, inasmuch as it concerns a water supply system, is achieved by a water supply system according to the invention.

The non-return valve according to the invention and for a water supply system, which however can also be applied for a pump, is integrated in the flow channel of the water supply system or of the pump or of a valve housing, if this is configured as a separate component. It comprises a sealing body which is movably mounted within the channel and which in a first position forming the closure position blocks the channel and in a second position forming the opened position releases the channel. According to the invention, the sealing body is movably arranged on a holder which comprises a closure body, with which the holder is releasably fastened in a housing opening.

Closure bodies in the context of the present invention are to be understood as any component, with which the housing opening is closable and on which a holder for the sealing body is arranged. A closure body in the context of the present invention can for example be a plug-like body which is fixed in a housing opening or a cap-like body which engages over a collar integrally formed on the housing opening.

The basic concept of the solution according to the invention is not to integrate the non-return valve in a channel sections as is usual, but to connect the non-return valve, the housing opening and the closure body to one another in a constructive and functional manner. Thereby, the solution according to the invention has the design advantage that the non-return valve, at least the part which is to be commonly exchanged in the case of wear, specifically the sealing body or the seal which is envisaged for this, can be controlled and exchanged by way of a simple removal of the closure body.

Thereby, it is particularly advantageous if the closure body is arranged at the exit side of the non-return valve in the flow direction, since the pressure which usually prevails there can then be reduced in a targeted manner on opening the closure body, and moreover fluid can be filled via this housing opening after removing the sealing body together with the holder, as is necessary for example for producing a self-priming effect with pumps, but also with a water supply system. The otherwise usual filling opening which must otherwise lie upstream of the non-return valve in the flow direction can be done away with by way of this arrangement. Moreover, further advantages which are yet described further below result in the case of a suitable design.

It is particularly advantageous if the holder at one end comprises the closure body, preferably in the form of a closure plug, and at the other end comprises the sealing body. A compact component then results and this can be integrated into the housing in the manner of a cartridge, wherein in the case of a suitable design, the sealing body is simultaneously also brought into its designated position in the non-return valve, on insertion and fixation of the closure body in or on the housing opening.

For this, it is partially advantageous if the closure body can be fastened in or on the housing opening by way of a bayonet connection or thread connection. Thereby, the thread design or bayonet design is advantageously a multi-staged configuration, so that in a first stage the non-return valve is opened and a bypass is formed between the closure body and the housing opening, in a second stage the non-return valve is closed which is to say is in the designated position and the bypass continues to exist, and only in a third stage does the closure body sealingly close the housing opening.

An O-ring is advantageously applied as a seal between the housing opening and the closure plug, since this is inexpensive, can be easily assembled and is easily exchangeable.

According to a further development of the invention, the closure body, in particular the closure plug comprises a handle or tool receiver, which is accessible from outside the housing. In the simplest form, a grip is provided for example as such a handle and this can be gripped with two fingers, so that the closure plug can be removed and installed without any tool. If in contrast the removal is only to be possible by specialists, then it is useful to design the closure body with a tool receiver, so that a removal is only possible with a corresponding tool.

The housing opening is advantageously provided with a peripheral, outwardly projecting collar which surrounds the closure plug at the peripheral side outside the housing. Such a funnel-like (funnel-shaped) collar on the one hand has the advantage that given a removed closure plug, the fluid in particular water can be filled into the housing directly via this opening, without further aids such as funnels or filling aids having to be used. When opening the closure plug, and specifically on bringing it from the closed position into the position, in which a bypass is formed, but the closure plug is still fixedly and securely held within the opening, an outwardly projecting peripheral collar moreover permits a pressure compensation in the region between the closure plug and this collar, so that any exiting fluid exits through the collar in a manner directly peripherally of the closure plug and not transversely thereto.

According to an advantageous further development of the invention, an overflow channel is provided in the closure body, preferably on the outer periphery of the closure plug, said overflow channel being released in the intermediate position, in which the closure body is still mechanically fastened in the housing opening, but the sealing of the closure body is no longer effective. Such an overflow channel as a bypass is particularly advantageous, since the pressure reduction here is possible in an even more targeted manner and a danger of injury can be avoided with a suitable handling, in particular if hot or aggressive fluid is present.

It is particularly advantageous with regard to design and handling technology, if the housing opening is arranged aligned to the channel section receiving the sealing body. Specifically, on the one hand the sealing seat within the channel is then easily accessible from the outside, at least with an instrument which reaches up to the sealing seat. On the other hand the holder can be a straight-lined configuration and configured in a manner which is simple with regard to the design.

The channel shape is basically freely selectable. However, it is particularly advantageous if the channel section receiving the sealing body has a circular cross section and is configured in a shouldered manner (with a shoulder portion), since the shouldered surface of the shoulder can then be used as an abutment for the sealing body and/or as a sealing surface. However, a radial surface of the shoulder preferably forms the sealing surface, since one can then work with an inexpensive and reliable O-ring as a seal.

For this, according to a further development of the invention, the sealing body advantageously comprises a carrier body which has a peripheral groove, in which the actual sealing ring, preferably configured as an O-ring, is integrated.

According to a further development of the invention, the carrier body is extended beyond the sealing seat and there, in combination with the channel forms a guide for the sealing body, in order on the one hand to be able to guide the carrier body in a precise manner but on the other hand to be able to design the guide means in a simple and inexpensive manner. The carrier body in this region thus advantageously comprises two, three or more rib-like formations, which slidingly bear on the channel wall and by way of this form a secure supporting and guidance.

In contrast, it is advantageous on the holder side, if the sealing body is seated at the end of at least one guide rod which is axially movably arranged in a guide rod receiver of the holder. The guide rod in the simplest form is formed by a cylinder rod or several individual rods, and then the guide rod receiver can be formed by a ring or a suitable body with a circular recess and permitting an axial movement.

The sealing body is advantageously impinged by a spring force in the closure direction, in order to reliably avoid a through-flow in the blocking direction of the valve, also in the pressure-less condition. One or more compression spring elements for example can be provided between the sealing body and the guide rod receiver for this. This is effected in a particularly simple and reliable manner by way of a helical spring which surrounds the guide rod and which is integrated between the sealing body on the one hand and the guide rod receiver on the other hand, preferably in a biased manner.

It is advantageous with regard to design as well as handling technology, if the channel runs in a manner angled to the valve exit and is directly obliquely or transversely to a common longitudinal axis of the closure body and sealing body. Such an arrangement is not only particularly advantageous for integration into the water supply system, but also for a pump housing or valve housing.

The non-return valve according to the invention is particularly advantageously applied in a water supply system with a single-stage or multi-stage electromotorically driven centrifugal pump which comprises an inlet connection which is conductively connected to the suction side of the pump, and an outlet connection which is conductively connected to the delivery side of the pump. Thereby, according to the invention, the non-return valve is integrated between the outlet connection and the delivery side of the pump, and this with regard to the arrangement is basically counted as belonging to the state of the art. Hereby however, when using the non-return valve according to the invention, it is particularly advantageous for several functions to be unified in this valve. Thus, for example on the one hand there exists the possibility of removing or disassembling the valve with few hand grips, and testing and overhauling it. Moreover, on the other hand there exists the possibility of filling fluid into the water supply system through the housing opening for the closure body, after removal of the sealing body, and thus a separate opening for this can be done away with. Finally, a prior pressure relief on the delivery side and also at the suction side is possible via the closure body, for example if a multi-step connection is applied between the closure body and the housing opening, as was described further above.

Thereby, the arrangement is advantageously such that the housing opening for the closure body is arranged on an upper side of the housing of the water supply system, and the outlet connection of the water supply system is arranged at a side transverse thereto. This is particularly suited to the preferred channel arrangement of the valve and moreover permits a particularly advantageous design of the water supply system.

Usefully, the outlet connection is arranged above the inlet connection and this is arranged above a drain connection which is closed by a releasable closure. This arrangement is particularly advantageous, since all hydraulic access openings are at one side of the water supply system, and only the housing opening for the closure body lies at the top, thus as a rule lies where the water supply system is easily accessible on operation.

It is particularly advantageous with regard to design if the pump is arranged in a lying manner, which is to say with a horizontal rotation axis, in the water supply system. The suction chamber of the pump is thereby advantageously arranged such that the inlet connection and/or the drain opening run out into this. It is to be understood that the drain opening is arranged as deeply as possible, in order to be able to drain the water in a complete as possible manner, for example in winter for ensuring frost/freeze protection.

Accordingly, after closure of the drain opening, water can be filled from above into the water supply system by way of removing the closure body and the sealing body which is connected thereto, to the extent that a self-priming, for recreating the operational situation occurs after the closure body and the sealing body have been inserted and the pump is switched on.

The invention is hereinafter explained in more detail by way of one embodiment example which is represented in the figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
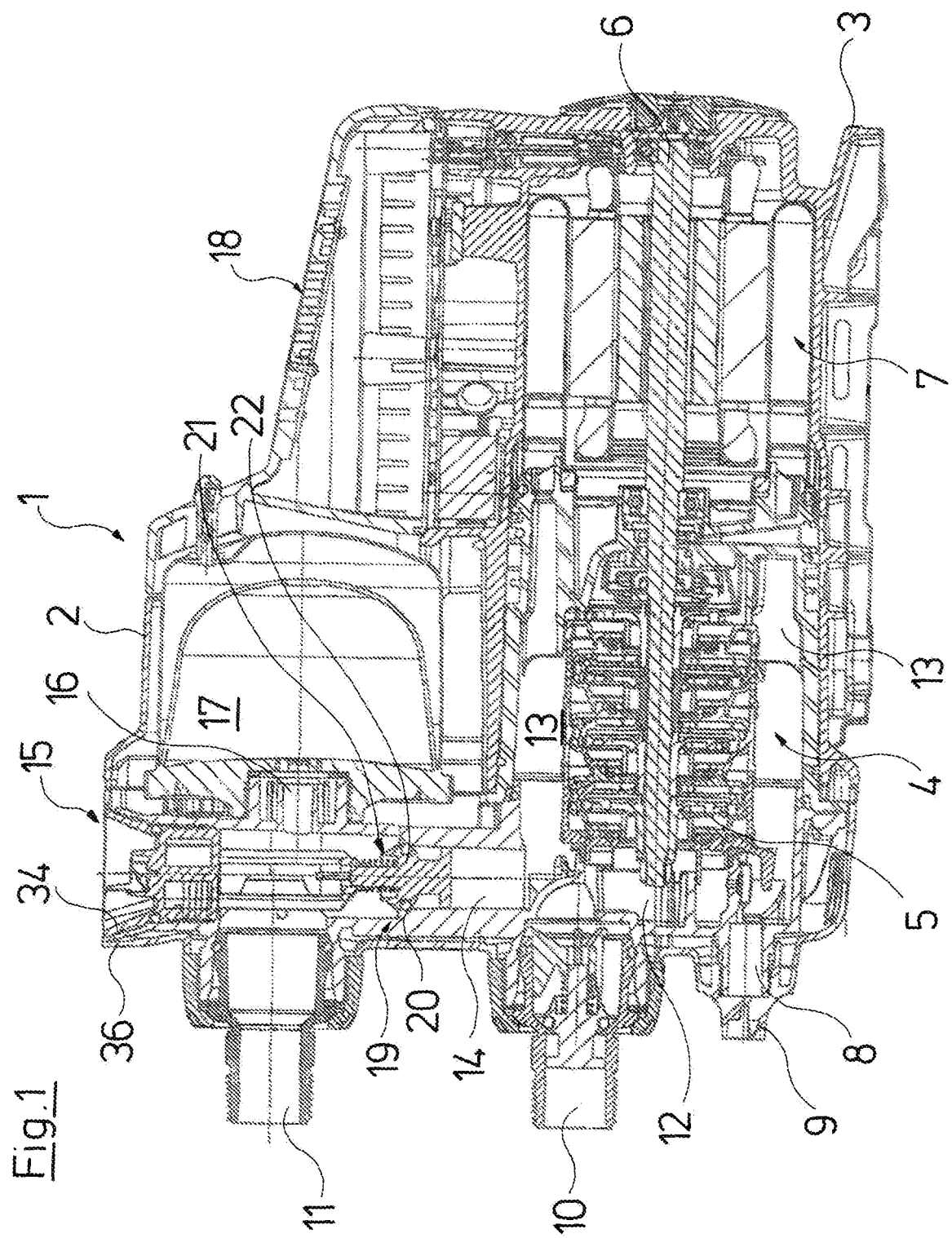
FIG. 1 is a greatly simplified schematic longitudinal sectional view through a water supply system with a non-return valve according to the invention.
Figure 2:
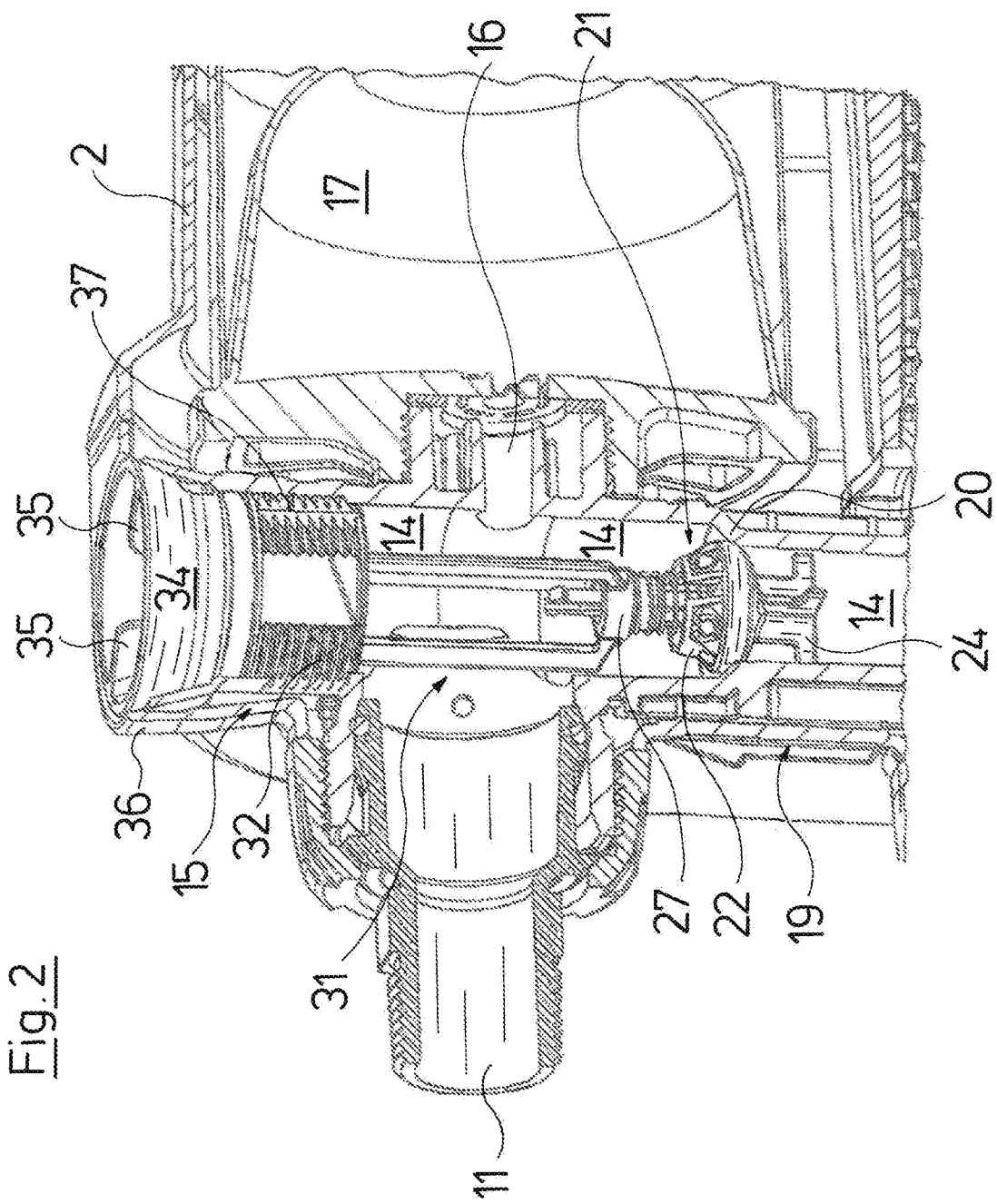
FIG. 2 is an enlarged perspective longitudinal sectional representation showing the part of the water supply system which is on the non-return valve side.

Referring to the drawings, the water supply system 1, which is represented by way of FIG. 1, is arranged in a closed housing 2 which comprises a foot 3, with which the water supply system 1 stands on the floor and is fastened there by screw as the case may be.

The water supply system 1 comprises a multi-stage centrifugal pump 4 which is arranged in a lying manner, thus is operated with a horizontal rotation axis. The impellers 5 of the pump 4 are arranged on a shaft 6 which forms part of an electric motor 7 driving the centrifugal pump 4.

The water supply system 1 at the side which is on the left in FIG. 1, close to its placement surface comprises a drain opening 8 which is closed off by a closure 9. An inlet connection 10 is arranged above the drain opening 8, and an outlet connection 11 is provided at a significant distance above the inlet connection 10. The inlet connection 10 runs out within the housing 2 of the water supply system 1 into a suction chamber 12 of the centrifugal pump 4. The fluid entering into the water supply system 1 via the inlet connection 10 gets into the suction chamber 12, from where it runs through the impellers 5 with the guide vanes arranged peripherally thereon, said impellers and guide vanes in each case forming a pump stage, until it exits out of the last pump stage and runs out into an annular channel 13 surrounding the pump stages of the centrifugal pump 4.

This annular channel 13 is connected below the pumps to the drain opening 8 and runs out above the pump into a channel 14 which is configured in an open manner at the end side (to the top in FIG. 1) and can be closed by a closure body, preferably in the form of a closure plug 15. The outlet connection 11, via which the fluid leaves the water supply system 1, runs out below the closure plug 15 and transversely thereto, into this channel 14. A connection 16, on which a diaphragm tank 17 as a pressure accumulator and compensation vessel is attached, runs out into the channel 14 in a manner 180 offset to this departure of the fluid. An electronics housing 18 which is arranged above the electric motor 7 and forms the complete control and regulation electronics of the water supply system 1 connects to the rear side of this diaphragm tank 17.

A non-return valve 19 is integrated within the channel 14, and the sealing seat 20 of this non-return valve is formed by a shoulder which arises due to the fact that the part of the channel 4 which is at the bottom in FIG. 1, in the region of the sealing seat 20, running obliquely upwards is widened to the upper part of the channel 14 which is larger in diameter. In the shown embodiment example, the sealing seat is formed by a chamfer-like oblique surface. The counter-piece is formed by a sealing body 21 which comprises a carrier body 22 with a peripheral groove, in which a sealing ring 23 in the form of an O-ring creating the actual sealing to the valve seat 20 is arranged.

The carrier body 22 in FIG. 1 is extended to the bottom, thus where the tapered part of the channel 14 is located, by four limbs 24 which arranged in a cross-shaped manner in cross section and which are formed radially widened towards the free end and there form guide surfaces 25, with which the carrier body 22 is axially movably guided within the channel 14. The carrier body 22 to the other side, thus to the top in FIGS. 1 to 5, comprises three guiding and locking (detent) limbs 26, with which the carrier body 22 is arranged and guided in an axially movable manner within a receiver 27 formed by a ring 27. The guide and locking limbs 26 are designed in a rod-like manner and at their free ends comprise detent lugs 28, so that the limbs 26 with the detent lugs 28 at the end spring in, on insertion into the receiver 27, and expand and spring out after passing through the receiver 27. The carrier body 22 is then axial movable but is otherwise held within the receiver 27 with a positive fit, which is to say positively. The radial outer sides of the guiding and locking limbs 26 together with the radial inner side of the receiver 27 form a guide for the carrier body 22, given its axial movement.

Figure 3:
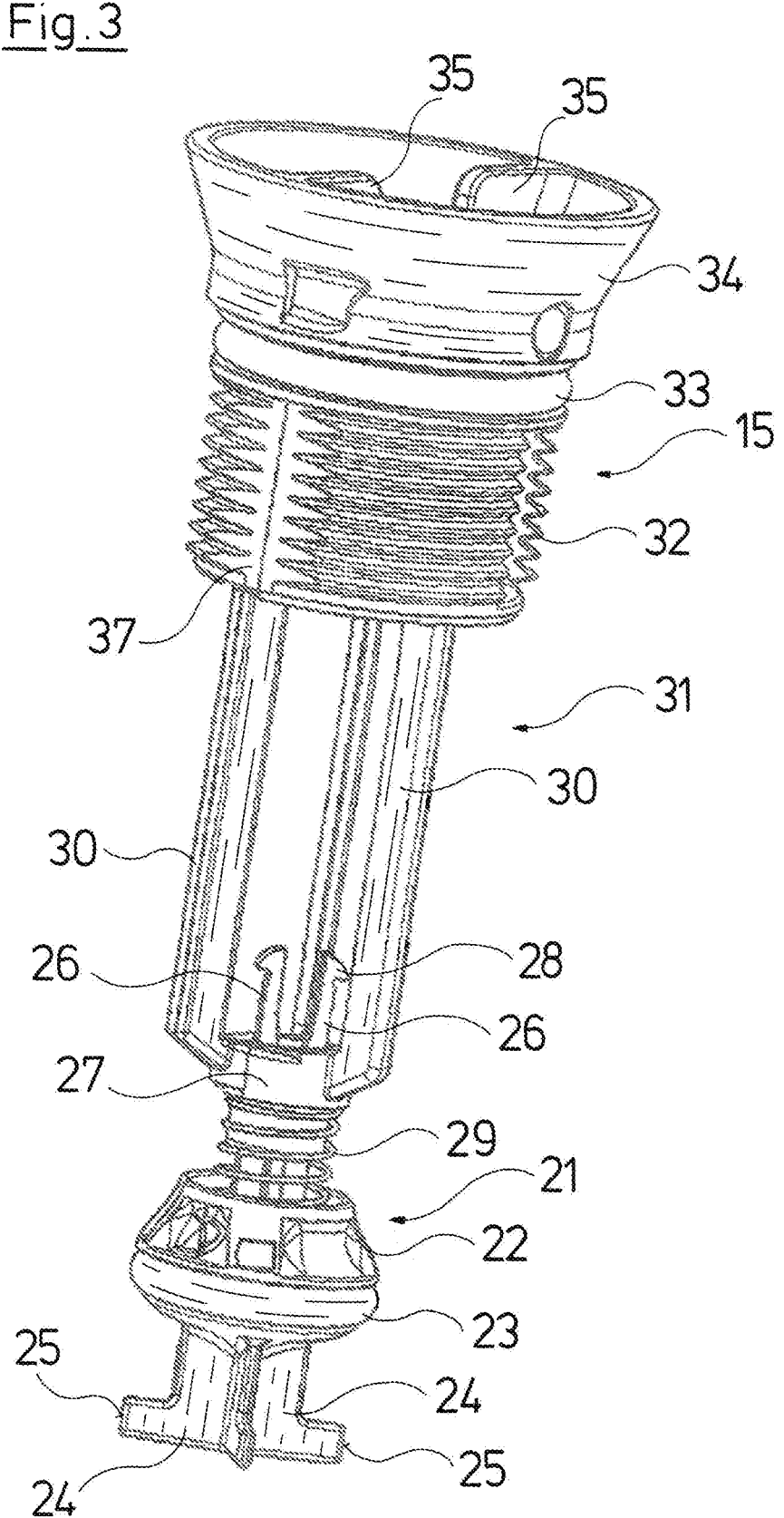
FIG. 3 is an enlarged perspective representation showing a holder a sealing body and closure plug.
Figure 4:
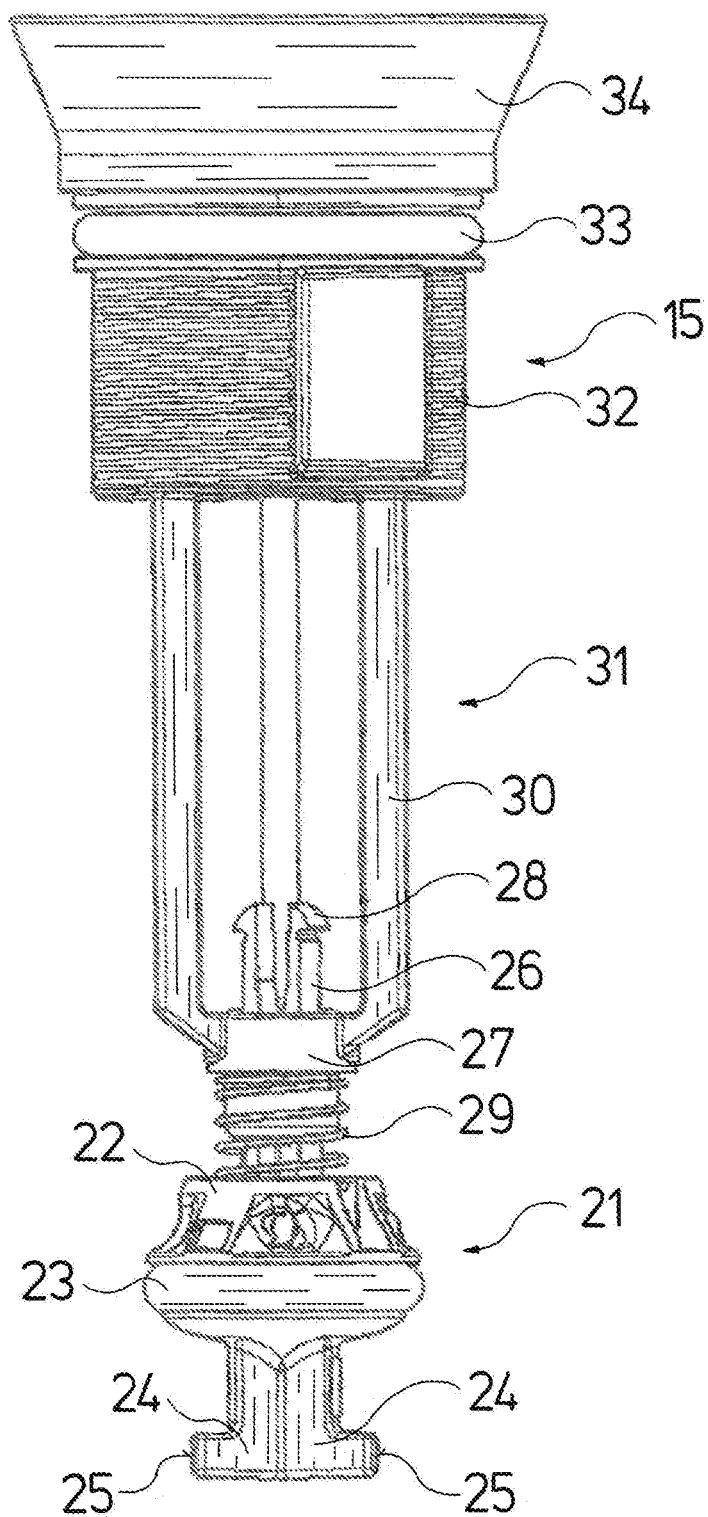
FIG. 4 is a lateral view showing a holder according to FIG. 3.

As is evident from the Figures, the carrier body 22 is integrated in the receiver 27 amid the integration of a helical spring 29 which is biased and impinges the carrier body 22 opposite the receiver 27 with force, so that in the non-installed condition, the detent lugs 28 bear on one side of the receiver 27 (this position is not shown in FIGS. 3 and 4 for the purpose of better representation of the guiding and locking limbs 26 with the detent lugs 28). This spring 29 ensures that the non-return valve 19 also remains in the closed position which is represented in FIG. 1 and in which the channel 14 is blocked, also in the condition without pressure.

The receiver 27 is seated at an end of a holder 31 which is formed from three guide rods 30 and which at one side axially movably carries the sealing body 21 and at the other side fixedly and immovably carries the closure plug 15.

The closure plug 15 is configured essentially cylinder-shaped and comprises an outer thread 32, with which it can be screwed in a corresponding inner thread at the end of the channel 14. The guide rods 30 of the holder 31 are fastened on a face side of a transverse wall which is at the bottom in the Figures, and an upper transverse wall is moreover provided at the upper end of the thread. The closure plug 15 comprises a peripheral groove in the region of the upper transverse wall, in which groove an O-ring 33 is integrated, said O-ring ensuring a sealed closure when the plug 15 is completely screwed in. A collar 34, to the side remote from the thread connects onto the groove for the O-ring 33, and this collar is configured in a slightly widened manner and two limbs 35 are formed at the inner side, wherein these limbs are also connected to the upper transverse wall and serve as a handle, in order to screw the closure plug 15 in and out. At the housing side, a collar 36 is provided at the upper end of the channel 14, parallel to the collar 34 of the closure plug 15.

The outer thread 32 is interrupted by perpendicular incisions 37, which forms a bypass, thus an overflow channel, between the pressure space of the outlet connection 11 and the surroundings.

The closure plug 15 on operation is screwed in the corresponding thread receiver at the upper end of the channel 14 of the housing 2, in a sealed and fixed manner and the O-ring 33 forms a sealed closure. The sealing body 21 is inserted into the channel 14 via the holder 31, wherein the sealing body 21 with its sealing ring 23 bears on the sealing seat 20 and is held in this position by way of the force of the helical compression spring 29. The non-return valve 19 is formed by way of this, and this blocks the backflow from the outlet connection 11 to the inlet connection 10. Only on reaching a certain pressure which lies above the pressure in the diagram tank 17 or in the outlet connection 11, does the non-return valve 19 open against spring force and release the hydraulic connection between the annular channel 13 and the outlet connection 11.

Figure 5:
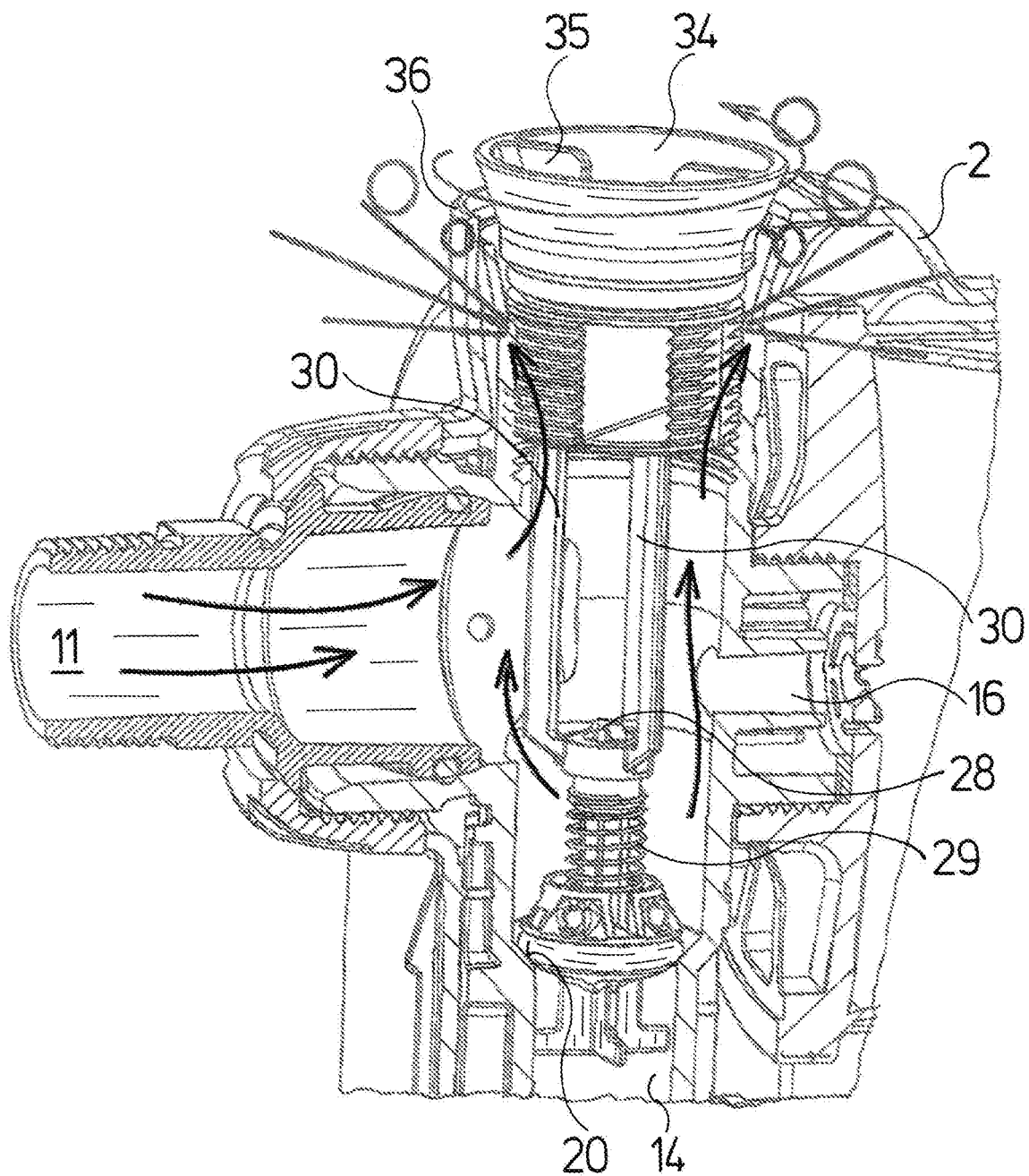
FIG. 5 is an enlarged perspective sectioned representation showing the flow course on opening the closure plug.

The non-return valve 19 prevents a pressure compensation if the inlet connection 10 is absent of pressure, but the delivery pressure is still present at the outlet connection 11, which is normal in the case of a switched-off pump. If the closure plug 15 is then rotated out, then this firstly gets into a position, in which the sealing ring 33 comes out of bearing contact on the housing opening, so that a bypass connecting the pressure space within the water supply system to the outer environment is formed via the incisions 37 in the outer thread 32. This position is represented in FIG. 5 and there it is also represented as to how this pressure escapes, be it by way of a fluid flow (arrows) or by way of releasing gas (gas bubbles), without there existing any danger to the operating person. A directed jet exit is prevented from being formed by way of the collars 34 and 36 which engaged tightly into one another, but rather gas escapes freely upwards and fluid through the gap formed between the collars 34 and 36.

If the closure plug 15 is then rotated further out, the sealing body 21 also lifts from the sealing seat 20, so that a hydraulic pressure compensation is formed between the inlet connection 10 and the outlet connection 11.

The function of the non-return valve 19 can be examined on the sealing body side after removal of the closure plug 15, and the sealing ring 23 can be exchanged as the case may be. The sealing seat 20 can also be cleaned or treated by way of introducing a suitable tool. The water which is necessary for producing a self priming effect can then be filled into the water supply system 1, since the sealing body 21 is also removed with the removal of the plug 15 via the holder 31.

The filling of the water can be effected through the opening on the upper side of the housing 2 which is otherwise closed by the closure plug 15, due to the fact that the sealing body 21 is removed and thus the function of the non-return valve 19 has been made inoperative. It is therefore not necessary to provide a separate filling opening upstream of the non-return valve 19, which would be necessary if the non-return valve 19 were to function.

While specific embodiments of the invention have been shown and described in detail to illustrate the application of the principles of the invention, it will be understood that the invention may be embodied otherwise without departing from such principles.

What is claimed is:

1. A water supply system, comprising:
    a housing comprising an inlet connection, an outlet connection and a housing opening, the inlet connection and the outlet connection being located on one side of the housing;
    a flow channel, at least a portion of the flow channel being located between the inlet connection and the outlet connection, the flow channel having a sealing seat;
    a non-return valve integrated into the flow channel, the non-return valve comprising:
        a holder;
        a sealing body movably mounted to the holder within the flow channel and configured to block the flow channel in a first position forming a closure position and configured to release the channel in a second position forming an opened position, wherein the sealing body comprises a carrier body with a peripheral groove;
        a closure body, which is configured as a closure plug fixedly connected to the holder, with which the holder is releasably fastened in the housing; wherein the housing opening is provided with a peripheral, outwardly projecting collar which surrounds the closure plug at the peripheral side outside the housing;
        an O-ring seal between the housing opening and the closure plug;
        an O-ring seal seated in the peripheral groove of the carrier body and sealing between the carrier body and the sealing seat,
    wherein an overflow channel is provided in the closure plug on an outer periphery thereof, the overflow channel being in a released state in an intermediate position of the closure plug, in which the closure body is still mechanically fastened in the housing opening, but the seal of the closure body is no longer effective in sealing between the housing opening and the closure plug, whereby fluid may freely pass out of the flow channel through the overflow channel;
    wherein the carrier body extends beyond the peripheral groove of the carrier body, beyond the O-ring seal seated in the peripheral groove of the carrier body and beyond the sealing seat of the flow channel in a direction away from the closure body and forms a guide configured to contact a surface of the flow channel beyond the O-ring seal seated in the peripheral groove of the carrier body and beyond the sealing seat of the flow channel in the direction away from the closure body to guide the carrier body relative to the contacted surface of the flow channel in a region of the flow channel on a side of the sealing seat directed away from the closure body.

2. A water supply system according to claim 1, wherein the non-return valve further comprises a thread connection or a bayonet connection between the closure body and the housing opening at the collar and a state of the connection between the closure body and the housing opening defines the intermediate position of the closure plug.

3. A water supply system according to claim 1, wherein the closure body comprises a handle or a tool receiver accessible from outside of the valve housing.

4. A water supply system according to claim 1, wherein the housing opening is arranged aligned to a channel section receiving the sealing body.

5. A water supply system according to claim 4, wherein the channel section receiving the sealing body has a circular cross section and is configured with the sealing seat, which comprises a shoulder forming an abutment for the sealing body or a radial surface of the shoulder forms the sealing surface or both the shoulder forms an abutment for the sealing body and a radial surface of the shoulder forms the sealing surface.

6. A water supply system according to claim 1, wherein the holder comprises at least one guide rod and a guide rod receiver and the sealing body is seated at the end of the at least one guide rod, which end is axially movably arranged in the guide rod receiver of the holder.

7. A water supply system according to claim 6, wherein the non-return valve further comprises a means for applying a spring force wherein the sealing body is impinged by the spring force in the closure direction.

8. A water supply system according to claim 7, wherein the means for applying a spring force comprises at least one compression spring surrounding the guide rod and arranged between the sealing body and the guide rod receiver.

9. A water supply system according to claim 1, wherein the flow channel is directed obliquely or transversely to a common longitudinal axis of the closure body and the sealing body.

10. A water supply system according to claim 1, wherein the holder comprises three rods, each of the three rods being located at a spaced location from each other.

11. A water supply system comprising:
 a single-stage or multi-stage electromotorically driven centrifugal pump;
 an inlet connection conductively connected to a suction side of the pump;
 an outlet connection conductively connected to a delivery side of the pump; and
 a non-return valve integrated in a flow channel between the outlet connection and the delivery side of the pump, the flow channel having a water supply system housing opening with a peripheral collar and having a sealing seat, the non-return valve comprising:
  a sealing body movably mounted within the channel and configured to block the channel in a first position forming a closure position and configured to release the channel in a second position forming an opened position;
  a holder, wherein the sealing body is movably arranged on the holder, at least a portion of the holder being located adjacent to an opening of the outlet connection; and
  a closure body configured as a closure plug fixed to a first axial end of the holder, the closure plug comprising fixing means cooperating with the water supply system housing opening for releasably fixing the non-return valve at the peripheral collar, the closure plug comprising a seal engaging the peripheral collar and an overflow channel cooperating with the seal and the peripheral collar, wherein the closure plug has a fully disengaged position in which the fixing means is disengaged from the peripheral collar and the seal is disengaged from the peripheral collar and a sealed position in which the fixing means is engaged with the peripheral collar and the seal seals the flow channel and an intermediate position with the fixing means engaged with the peripheral collar and with the closure plug mechanically fastened to the peripheral collar and the overflow channel forming a fluid passage from the flow channel to outside of the housing,
 wherein the sealing body is moveably mounted to the holder at a second axial end of the holder and the sealing body comprises:
  a carrier body with a peripheral groove and a sealing ring mounted in the peripheral groove, the sealing ring being mounted and configured to engage the sealing seat in the closed position; and
  a guide comprising guide surfaces extending axially away from the holder and configured to extend beyond the sealing seat and beyond the peripheral groove and the sealing ring mounted in the peripheral groove, the guide surfaces being configured to contact a surface of the flow channel beyond the O-ring seal seated in the peripheral groove of the carrier body and beyond the sealing seat of the flow channel in the direction away from the closure body to guide the sealing body relative to the contacted surface of the flow channel.

12. A water supply system according to claim 11, wherein the housing opening for the closure body is arranged on an upper side of a housing of the water supply system and the outlet connection is arranged at a side transversely thereto, at least a portion of the flow channel being located adjacent to the pump.

13. A water supply system according to claim 12, wherein the outlet connection is arranged above the inlet connection and above a drain opening on one side of the housing, which drain opening is closed by a releasable closure.

14. A water supply system according to claim 11, wherein the pump is arranged with a horizontal rotation axis and comprises a suction chamber, into which the inlet connection as well as a drain opening run out, at least a portion of the pump being arranged opposite the inlet connection.

15. A water supply system according to claim 11, wherein the closure body closes the housing opening, via which fluid can be supplied for priming of the pump, the portion of the holder being located opposite the outlet connection.

16. A water supply system according to claim 11, wherein the holder comprises three rods, each of the three rods being located at a spaced location from each other.

17. A water supply system comprising:
 a pump with a housing comprising:
  an inlet connection conductively connected to a suction side of the pump;
  an outlet connection; and
  a flow channel connecting a delivery side of the pump to the outlet connection, the flow channel having a smaller dimension portion and the flow channel transitioning at a sealing seat to a widened portion, the widened portion extending from the sealing seat to a circumferential collar at an opening of the flow channel to an exterior of the housing; and
 a non-return valve disposed in the flow channel, the non return valve comprising:
  a holder having a first axial end and a second axial end;

a closure plug fixed to the first axial end of the holder, the closure plug comprising fixing means cooperating with the circumferential collar for releasably fixing the non-return valve to the housing in the flow channel, the closure plug comprising a ring seal engaging the circumferential collar for sealing the flow channel relative to an outside of the housing at the circumferential collar and an overflow channel cooperating with the ring seal and the circumferential collar, wherein the closure plug has a fully disengaged position in which the fixing means is disengaged from the circumferential collar and the seal is disengaged from the circumferential collar and a sealed position in which the fixing means is engaged with the circumferential collar and the ring seal seals the flow channel relative to the outside of the housing at the circumferential collar and an intermediate position with the fixing means engaged with the circumferential collar and mechanically fastening the closure plug to the circumferential collar and with the overflow channel forming a fluid passage, past the circumferential collar and the ring seal, from within the flow channel to outside of the housing; and a sealing body moveably mounted to the holder at the second axial end of the holder and configured to move, inside the flow channel, between a first position, which forms a valve closed position and shuts off the flow channel connection from the delivery side of the pump to the outlet connection and a second position, which forms a valve open position, releasing flow through the flow channel from the delivery side of the pump to the outlet connection, wherein the sealing body comprises a carrier body with a circumferential groove and a sealing ring mounted in the circumferential groove, the sealing ring being mounted and configured to engage the sealing seat in the closed position and with a guide comprising guide surfaces extending in a direction axially away from the holder and configured to extend beyond the sealing seat and beyond the sealing ring mounted in the circumferential groove of the carrier body, with the guide surfaces contacting a surface of the flow channel beyond the O-ring seal seated in the peripheral groove of the carrier body and beyond the sealing seat of the flow channel in the direction away from the closure body, to guide the sealing body relative to the smaller dimension portion of the flow channel, wherein the guide surfaces are maintained in the smaller dimension portion of the flow channel, with the sealing ring engaging the sealing seat in the closed position, with the closure plug in the intermediate position and with closure plug in the sealed position.

18. A water supply system according to claim 17, wherein:
   the outlet connection is arranged at a side extending transversely to the flow channel; and
   the holder comprises one or more guide rods connecting the closure plug to the sealing body and defining fluid passages for fluid flow from the flow channel to the transversely extending outlet connection.

19. A water supply system according to claim 18, wherein one or more guide rods provide guide surfaces configured to guide the non-return valve relative to the widened portion of the flow channel.

* * * * *